United States Patent Office 3,382,791
Patented May 14, 1968

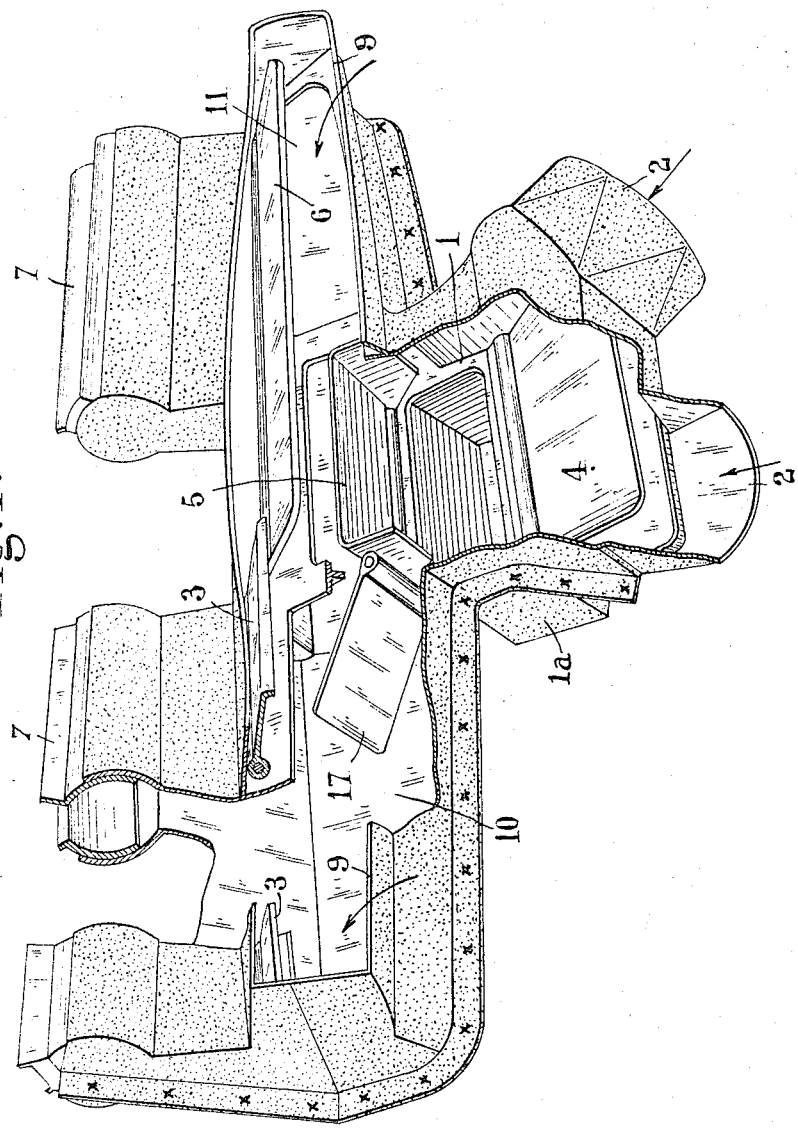

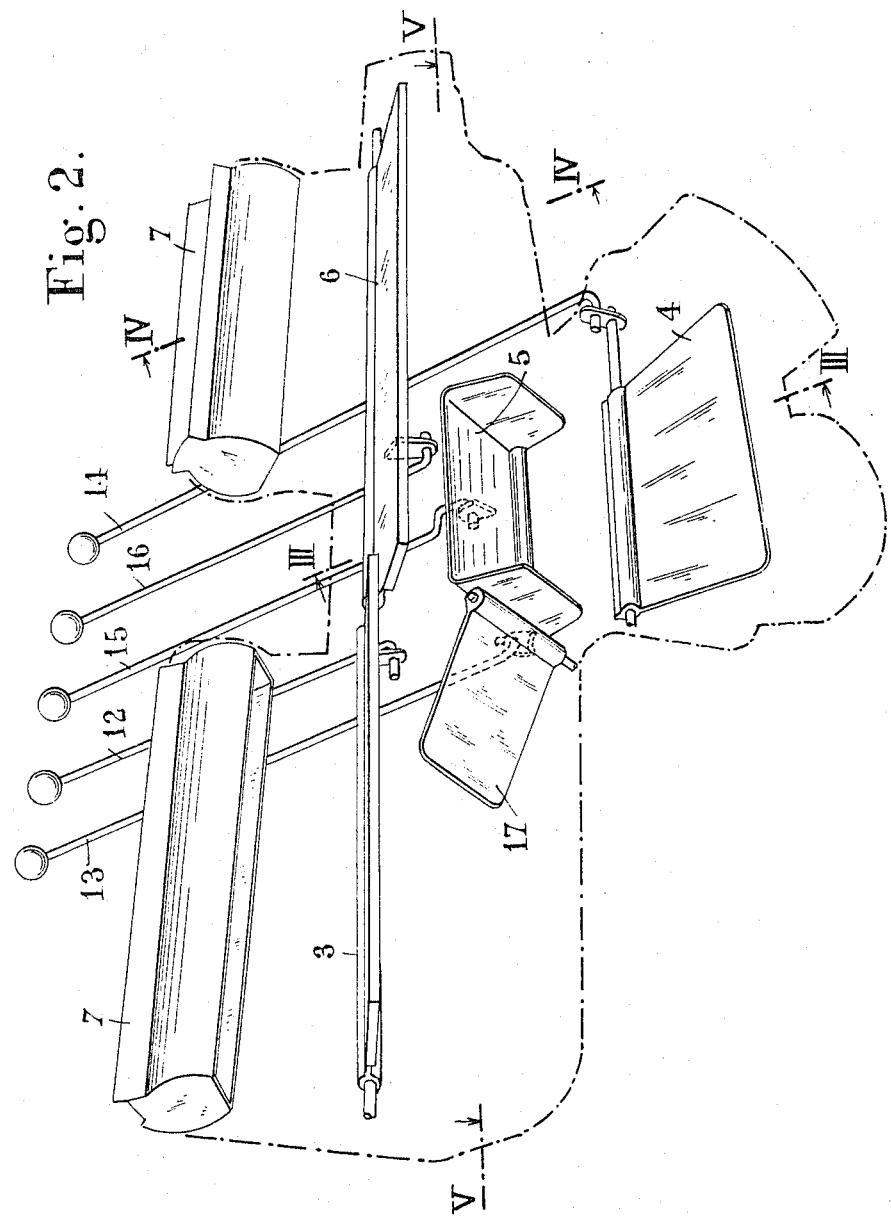

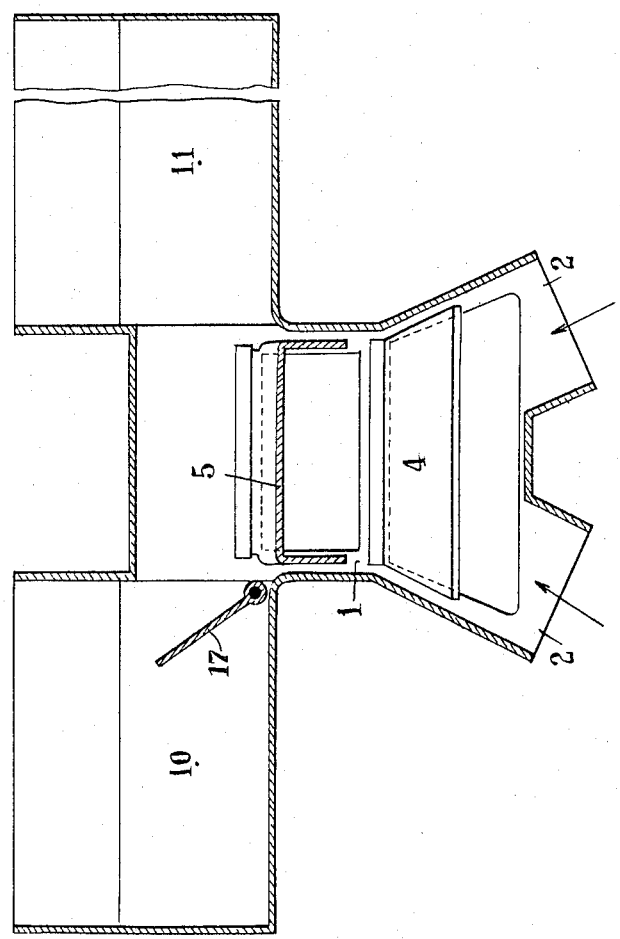
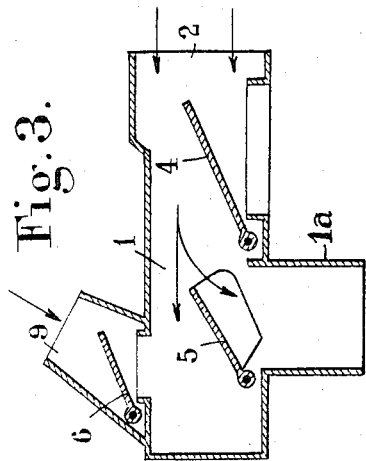
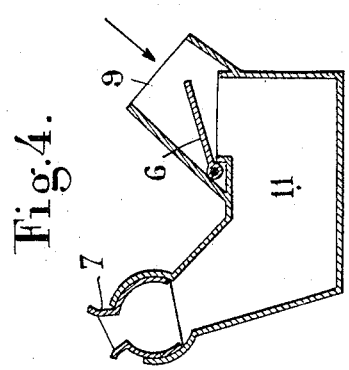

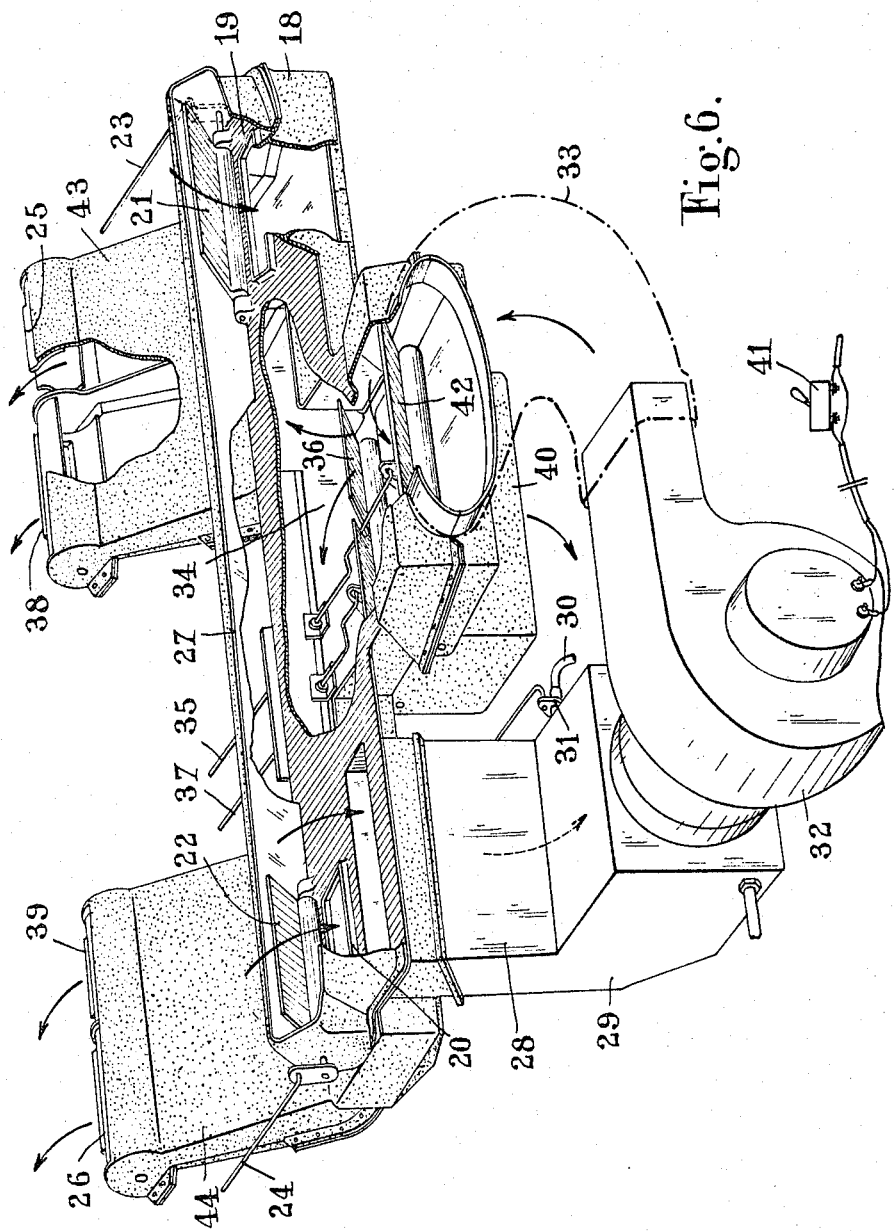

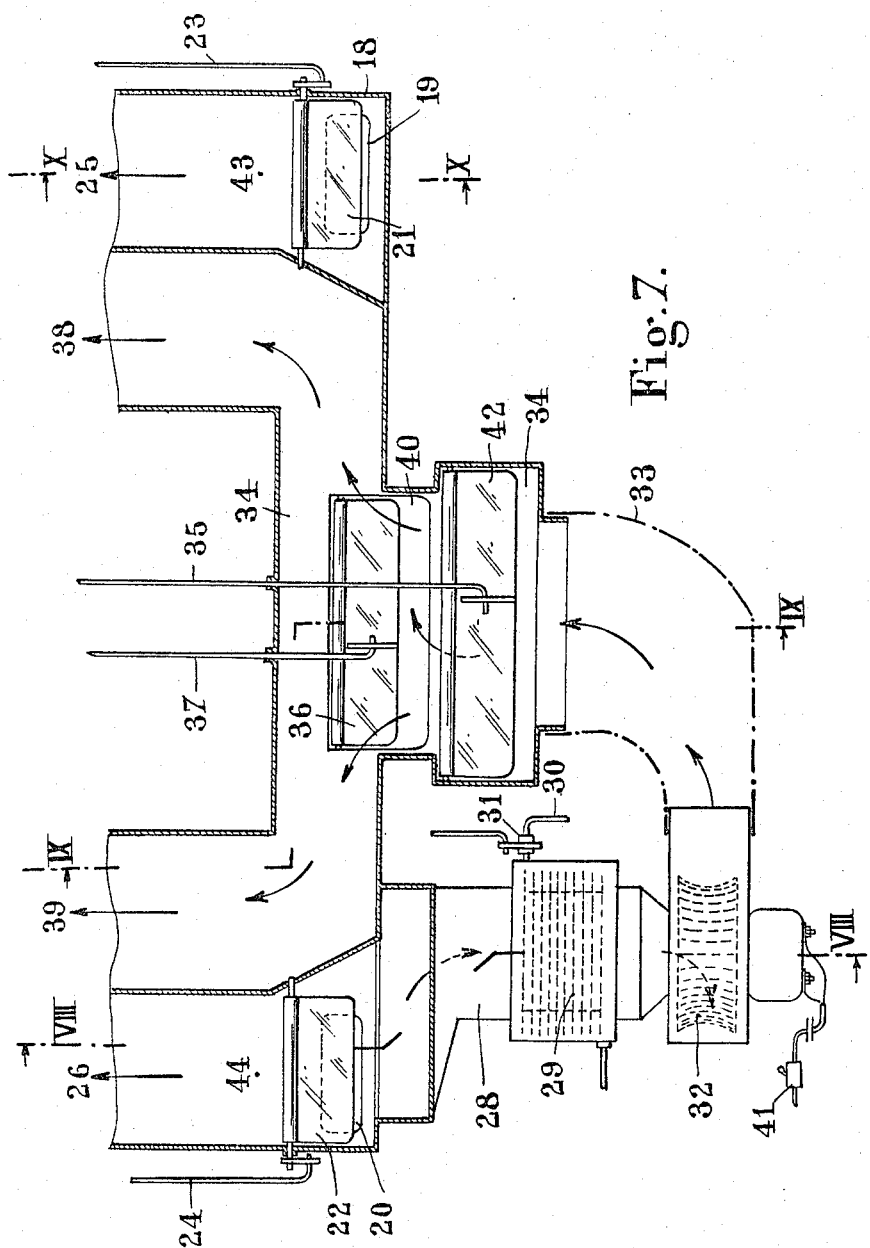

3,382,791
HEATER-DEMISTER DISTRIBUTORS FOR VEHICLES
Edmond Henry-Biabaud, Paris, France, assignor to Societé Anonyme Andre Citroen, Paris, France, a French company
Filed Feb. 2, 1966, Ser. No. 524,519
Claims priority, application France, Feb. 3, 1965, 4,227
7 Claims. (Cl. 98—2)

ABSTRACT OF THE DISCLOSURE

An air-conditioning distributor for the passenger space of an automotive vehicle comprises a casing consisting of two molded parts joined together to form a central chamber and two lateral chambers. A valve controlled inlet admits temperature controlled air to the central chamber and a shutter variably and selectively directs air from the central chamber to the lateral chambers and to a duct directed downwardly to a lower portion of the passenger space. Individually valve controlled intakes supply fresh air to each of the lateral chambers and swivelling nozzles direct air from the lateral chambers to upper lateral portions of the passenger space. The temperature controlled air is preferably supplied to the central chamber by a blower and a heat exchanger in circuit with the engine cooling system. The lateral chambers may be divided into two chambers, one of which communicates with the central chamber and the other with the fresh air intake.

---

Hitherto known heater-demister devices for distributing air for heating and ventilation purposes in automotive vehicles consisting mostly of separate members and controls, and if metal components are used to this end they are frequently rather noisy.

To avoid these inconveniences, the present invention allows the assembly of the various components into a single unit adapted to be secured to the front wall of the passengers' space while fitting and connecting the unit to the air outlet pipes or nozzles which are prepared beforehand at a predetermined location.

The manual controls are positioned close together within easy reach of the driver, as already known in the art, and may advantageously be disposed in a manner capable of suggesting to the users their inherent functions from their specific positions in the group of controls.

A specific advantage of the present invention is that it permits adjusting separately and gradually for the driver and the front passenger the heating air—herein referred to as thermal air and fresh air distributed to the upper and/or lower zones of the passengers' space.

It is another advantage of the present invention to make possible the manufacture of this air-conditioning unit by plastic molding or shaping techniques, for example by using only two parts, so that the mounting is particularly easy and rapid. On the other hand this feature affords a maximum reduction in the number of joints to be sealed by means of gaskets or the like to prevent leakages of air from the engine compartment which air may be more or less polluted with oil and gas.

This molded part of elongated configuration comprises three inner chambers or compartments, that is, a central chamber closed on the side opposite to the hot air inlets and two lateral chambers communicating with this central chamber. The central chamber is provided with a shutter controlling the delivery of heating air through the nozzle or nozzles connected to the ducts supplying air heated by the engine, and another shutter for distributing heating air sidewise or downwards.

At least one of the lateral chambers communicates with said central chamber by means of an adjustable shutter and these lateral chambers communicate with the fresh air intakes and deliver conditioned air through adjustable or swivelling nozzles disposed at the bottom of the windshield. Flap-valves are provided for adjusting the volume of delivered fresh air for example by means of a transverse air nozzle disposed beneath the windshield.

It is another object of the present invention to provide a specific disposal of this heater-demister distributor using a heat exchanger possibly in combination with an air fan.

To this end, the heater-demister device for conditioning the air in the passengers' space of an automotive vehicle comprises three separate air circuits:

Two direct circuits on the right-hand and left-hand sides of the instrument panel for delivering fresh air under moderate pressure, taken from the surrounding atmosphere by dynamic action only when the vehicle is running.

One indirect air circuit taking air from the surrounding atmosphere and directing same through a radiator with, if desired, the assistance of a fan and expelling it into the interior of the vehicle.

To this end, the air conditioning unit according to the present invention includes at its lateral ends fresh air intakes, adjustment flap-valves and ducts leading in the desired direction to the top of the instrument panel to form a first pair of fresh-air circuits.

This unit further includes a fresh air intake in a duct leading to the heat exchanger, this air being possibly driven by a fan and being directed into the central chamber; from this chamber the air is directed by means of an adjustable flap-valve to the lower portion of the passengers' space and/or to swivelling nozzles mounted on top of the instrument panel, in the vicinity of the direct-circuit nozzles.

Two exemplary forms of embodiment of air conditioning units according to this invention will now be described with reference to the attached drawings, in which:

FIGURE 1 is a cut-away perspective view of the unit with the outer casing removed to show the interior;

FIGURE 2 is a perspective view of the set of control shutters or flap-valves with the control means therefor;

FIGURE 3 is a vertical section taken along the line III—III of FIGURE 2;

FIGURE 4 is another vertical section taken along the line IV—IV of FIGURE 2;

FIGURE 5 is a horizontal section taken along the line V—V of FIGURE 2;

FIGURE 6 is a cut-away perspective view from the front, showing a force-air system;

FIGURE 7 is an explanatory diagram;

Figure 8:
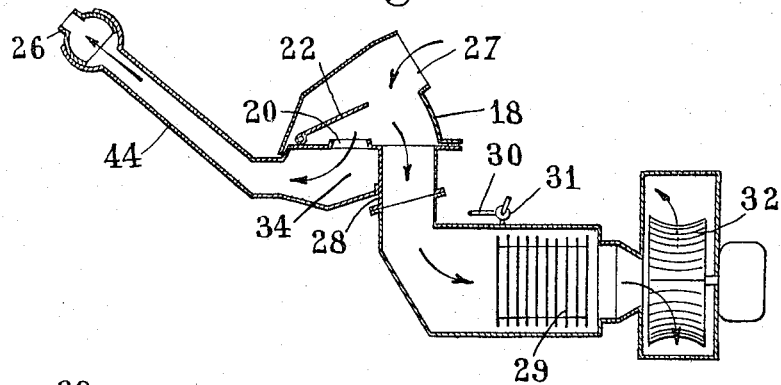
FIGURES 8, 9 and 10 are explanatory diagrams in the form of sections taken respectively along the lines VIII—VIII, IX—IX and X—X of FIGURE 7.

In the embodiment shown in FIGS. 1 to 5, the unit is shown in the form of a box-like structure of substantially elongated configuration comprising two sections assembled by spot-welding as shown diagrammatically by crosses in FIGURE 1. It is adapted to be mounted on the instrument panel of the automotive vehicle or at any other suitable location easily accessible to the driver for control purposes, this structure incorporating the shutters or valves for opening and closing the fresh-air and heating-air ducts, and the control means therefor.

The air conditioning unit, as shown in FIGURES 1 to 5 of the drawings, comprises three chambers, that is, a central chamber 1 closed on the side opposite to the heated-air intakes 2 and two lateral chambers 10 and 11 communicating with said central chamber.

The central chamber 1 contains valve means 4 and 5 of which the first controls the delivery of heating air to the device and the second controls the distribution of this air to the lower portion of the passenger space through a discharge duct 1a or lateral portions of the passengers' space through lateral chambers 10 and 11.

The lateral chambers 10 and 11 communicate with fresh-air intakes 9 and air from these chambers is delivered into the passenger compartment by swivelling or adjustable nozzles 7.

In the example illustrated, the heated-air intake 2 is connected to a pair of ducts leading to the engine cylinders and the fresh air intake 9 extends across the width of the vehicle in the form of a single slot, but it may also comprise one or several smaller apertures, if desired.

As shown in FIGURES 3, 4 and 5, the valve 4 controls the volume of heated air delivered to the central chamber from which it is distributed in the manner adjusted by means of the other shutter 5. When the shutter 5 is in the position shown in FIG. 3, part of the hot air admitted through the valve 4 is directed downwardly through the duct 1a to the lower portion of the passenger compartment, and part flows into lateral chamber 11 and also into lateral chamber 10 if the valve 17 is open. These shutters 4 and 5 are hingedly mounted so as to be actuated by control levers 14 and 15 consisting of rods conveniently located within easy reach of the driver.

The swivelling nozzles 7 communicate with the lateral chambers 10 and 11 fed from intake 9 and are used to demist the windshield and ventilate the upper part of the passenger space.

The shutters 3 and 6 which are controlled by rods 12 and 16 respectively are used for regulating the fresh air input; in the example illustrated shutter 3 regulates the ventilation in the right hand upper portion of the vehicle (on the left-hand side in the drawing) and shutter 6 regulates both the left-hand upper ventilation (on the right-hand side in the drawing) and the ventilation directed to the lower portion of the passengers' space through the central chamber 1 and duct 1a.

The shutter 17 is adapted to cut off the communication between the chamber 1 and chamber 10, and therefore to isolate this chamber 10, whereby fresh air can be ventilated through chamber 10 while heating or demisting through chamber 11. This shutter 17 is controlled by rod 13.

A second shutter may also be provided for cutting off the communication between chamber 1 and chamber 11, but in most practical circumstances this would not constitute an essential advantage.

The shutter 4 is a heating cut-off valve controlled by rod 14. In its upper position it prevents the heated air from penetrating into the passengers' space and returns it to the engine compartment.

The heat is distributed to the upper and/or lower portion of the passengers' space by means of a hinged shutter 5 controlled by rod 15.

It will be seen that the set of control knobs permits independent adjustments for the driver and the front passenger. Thus notably the driver may direct warm air towards the windshield for demisting same while fresh air is directed to the front passenger's face and feet.

Figure 9:
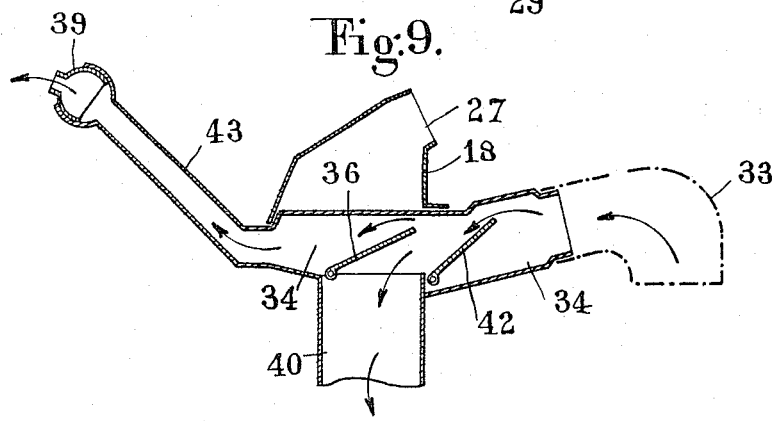
Figure 10:
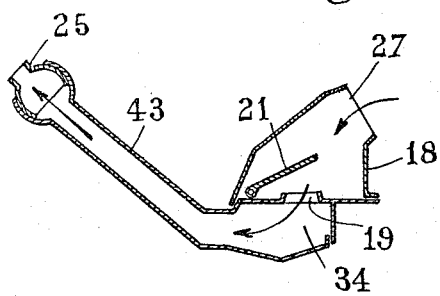

The distributor according to the form of embodiment illustrated in FIGURES 6 to 10 comprises an elongated casing 18 secured to the front of the vehicle and formed with two lateral inlet ports 19 and 20 for the ingress of fresh air under the control of flap-valves 21 and 22 actuated from inside by means of control rods 23 and 24. These inlet ports are connected by means of ducts 43 and 44 to swivelling nozzles 25 and 26 respectively, opening for example into the space underlying the instrument panel (not shown).

The casing illustrated comprises an air intake 27 connected at least on one side to a duct 28 leading into an enclosure containing a radiator 29 connected to the engine cooling fluid circuit 30 and controlled either by a cock 31 or by suitable remote control means.

The air outlet from the radiator 31 connects with the intake of a fan 32 having its delivery side connected to a duct 33 leading to a central chamber 34 integral with the casing 18. The output from the fan is adjustable by remote control means consisting essentially of a rod 35 controlling a shutter 42. The distribution may be remote-controlled by means of a rod 37 controlling the flap-valve 36 for supplying warm air to the lower portion of the passengers' space by means of a duct 40 and/or swivelling nozzles 38 and 39 located for example in the vicinity of the swivelling nozzles 25 and 26.

The fan is started and stopped by actuating adequate control means 41 disposed within easy reach of the driver.

Thus, the user may, by actuating the control members 23 and 24, adjust at will the fresh air output directed towards the windshield or any other portion of the body. He may also adjust by means of control member 37 the output of the air directed into the central chamber 34 and heated if desired by the radiator 29, and driven by fan 32; this cold or warm air is distributed through the swivelling nozzles 38 and 39 under control of the control rod 37.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. Distributor for air-conditioning the passengers' space of an automotive vehicle, comprising a casing consisting of two parts joined to form a casing divided internally into a central chamber and two lateral chambers communicating with said central chamber, a discharge duct directing air from said central chamber to a lower portion of said passengers' space, swivelling nozzles for directing air from said lateral chambers to upper lateral portions of said passengers' space, swivelling nozzles for directing plying thermal air to said central chamber, first valve means controlling the flow of thermal air through said inlet duct to said central chamber, shutter means for variably and selectively controlling the flow of air from said central chamber to said downwardly directed discharge duct and to said lateral chambers respectively, fresh air intakes leading into said lateral chambers respectively, second valve means separately controlling each of said fresh air intakes, and grouped control members within easy reach of the driver of said vehicle for individually controlling said valve means and said shutter means.

2. Air-conditioning distributor according to claim 1, further comprising third valve means controlling the flow of air between said central chamber and at least one of said lateral chambers.

3. Air-conditioning distributor according to claim 1, in which each of said lateral chambers is divided into a first compartment communicating with said central chamber and a second compartment communicating with said fresh air intake and in which a said swivelling nozzle is provided for each of said compartments of each lateral chamber.

4. Air-conditioning distributor according to claim 1, further comprising heat exchanger means and blower means for delivering temperature controlled air to said thermal air inlet duct of said central chamber.

5. Distributor for air-conditioning the passengers' space of an automotive vehicle, comprising casing consisting of two molded parts united to form said casing, said casing being divided internally to provide a central chamber and two lateral chambers, each of said lateral chambers being further divided into a first compartment communicating with said central chamber and a second compartment, a thermal air inlet to said central chamber, means for supplying temperature controlled air to said thermal air inlet, first valve means controlling the supply of thermal air to said central chamber through said inlet, a discharge duct for directing air downwardly from said central chamber to a lower part of said passengers' space, shutter means for variably and selectively controlling flow of air from said central chamber to said downwardly directed discharge duct and to said lateral chambers respectively, fresh air intake means for said second compartment of each of said lateral chambers, valve means individually controlling the admission of fresh air through said intake means to said compartments, swivelling nozzles for directing air from each of said compartments of each of said lateral chambers to upper lateral portions of said passengers' space, and grouped control members within easy reach of the driver of said vehicle for separately controlling said valve means and said shutter means.

6. Air-conditioning distributor according to claim 5, in which said means for supplying temperature controlled air to said thermal air inlet comprises a radiator inserted in the engine cooling circuit of the vehicle and blower means for producing flow of air through said radiator and to said inlet.

7. Air-conditioning distributor according to claim 5, in which each said swivelling nozzle comprises a cylindrical portion of said casing having a lengthwise slot and a cylindrical nozzle member turnable in said cylindrical casing portion and having flow directing discharge means for directing the flow of air through said slot in a direction controlled by the rotative position of said nozzle member in said cylindrical casing portion.

References Cited

UNITED STATES PATENTS

| | | | |
|---|---|---|---|
| 2,738,718 | 3/1956 | Reynolds | 98—2.4 |
| 2,860,567 | 11/1958 | Wilfert | 98—2.4 |
| 3,078,779 | 2/1963 | Wilfert | 98—2.4 |
| 3,138,085 | 6/1964 | Mitchell | 98—2.5 |
| 3,301,161 | 1/1967 | Attwood | 98—2 |
| 3,301,484 | 1/1967 | De Castelet | 98—2 |
| 3,326,110 | 6/1967 | Orr | 98—2 |

MEYER PERLIN, *Primary Examiner.*